United States Patent [19]
Tanaka et al.

[11] Patent Number: 6,104,418
[45] Date of Patent: Aug. 15, 2000

[54] METHOD AND SYSTEM FOR IMPROVED MEMORY INTERFACE DURING IMAGE RENDERING

[75] Inventors: Greg L. Tanaka, Sunnyvale; Sean Hsi-an Kuo, Saratoga; Kenneth Choy, Castro Valley; Michael M. Lee, San Jose; Gregory M. Stefanek, Mountain View, all of Calif.

[73] Assignee: Silicon Magic Corporation, Sunnyvale, Calif.

[21] Appl. No.: 09/055,566

[22] Filed: Apr. 6, 1998

[51] Int. Cl.[7] ....................................................... G06F 13/16
[52] U.S. Cl. ......................... 345/521; 345/513; 345/430; 711/5
[58] Field of Search ..................................... 345/507–510, 345/430, 521, 503, 515; 711/5, 118

[56] References Cited

U.S. PATENT DOCUMENTS

| | | | |
|---|---|---|---|
| 5,473,573 | 12/1995 | Rao | 365/230.01 |
| 5,555,526 | 9/1996 | Kim | 365/203 |
| 5,751,292 | 5/1998 | Emmot | 345/430 |
| 5,751,988 | 5/1998 | Fujimura | 711/5 |
| 5,828,382 | 10/1998 | Wilde | 345/501 |

*Primary Examiner*—Kee M. Tung
*Attorney, Agent, or Firm*—Sawyer Law Group LLP

[57] ABSTRACT

Aspects for increasing efficiency of memory accesses during graphics rendering are provided. A preferred method aspect includes providing a plurality of memory banks for data, and decoding input signals that indicate accessing of at least one of the plurality of memory banks for a desired plurality of words of data. The method further includes splitting data access across the plurality of memory banks to allow parallel selection of an output from at least one of the plurality of memory banks as the desired plurality of words of the data, wherein latency of data access is amortized. A system aspect for improving data transfer from memory to a texture mapping unit includes a plurality of cache banks for storing texel data, a bank decode unit coupled to the plurality of cache banks for decoding a plurality of input signals indicative of selection of texel data from one or more of the plurality of banks, and selection control logic for receiving decoded address data from the bank decode unit and controlling selection of the plurality of cache banks to retrieve the texel data for output to the texture mapping unit.

19 Claims, 5 Drawing Sheets

METHOD AND SYSTEM FOR IMPROVED MEMORY INTERFACE DURING IMAGE RENDERING

FIELD OF THE INVENTION

The present invention relates to the field of graphics rendering, and more particularly, to improving memory accesses for data retrieval during graphics rendering.

BACKGROUND OF THE INVENTION

Computer systems are increasingly important components in providing images for modeling, predicting, and experimenting with events in many situations. Examples of such situations include flight simulators for training exercises, computer aided drafting and design (CAD) applications for engineers and architects, animated activities in movies and video games, and diagnostic medical devices for physicians. Improvements in display systems, including the development of high resolution display screens, allows greater precision and clarity in displaying geometric objects.

In general, display systems comprise three components: a frame buffer, a monitor, and a display controller. The frame buffer is a digital memory for storing the image to be displayed as a series of binary values. The monitor includes a screen having an array of picture elements, i.e., pixels. Each pixel represents a dot on the screen and can be programmed to a particular color or intensity with thousands of pixels programmed to represent a displayed image. The frame buffer stores these pixel values. The display controller typically is the interface for passing the contents of the frame buffer to the monitor by converting the data from the frame buffer to a video signal for display by the monitor.

Typically, 3D image rendering involves several processing procedures, such as alpha blending, texture mapping, and Z buffering. Image data stored in memory is usually retrieved in a stochastic manner during these processing procedures and suffers from significant bandwidth problems. Attempts to combat bandwidth problems have included providing memory chips that have separate ports for each type of data. However, the pin count for a device using the memory increases significantly as the number of bits being accessed increases. For example, for 64 bits of data, a chip would typically require about 90 pins to support the data bits and account for power and ground considerations. Further, increases in the size of the chips increases overall cost, power, and area requirements. Another attempt to reduce pin-count problems involves the use of a Rambus which enables very high on-board data transfers with the use of a very fast clock. Unfortunately, while Rambus does achieve fast access for sequential data bursts, accesses which are more random, such as those for texture mapping, do not provide as much speed increase.

What is needed is a more efficient manner of accessing memory randomly, especially during graphics rendering.

SUMMARY OF THE INVENTION

The present invention addresses the need for more efficient interfacing with memory that stores data in a graphics processing system. A method aspect includes providing a plurality of memory banks for data, and decoding input signals that indicate accessing of at least one of the plurality of memory banks for a desired plurality of words of data. The method further includes splitting data access across the plurality of memory banks to allow parallel selection of an output from at least one of the plurality of memory banks as the desired plurality of words of the data, wherein latency of data access is amortized.

A system aspect for improving data transfer from memory to a texture mapping unit includes a plurality of cache banks for storing texel data, and a bank decode unit coupled to the plurality of cache banks for decoding a plurality of input signals indicative of selection of texel data from one or more of the plurality of cache banks. Further, selection control logic is included for receiving decoded address data from the bank decode unit and controlling selection of the plurality of cache banks to retrieve the texel data for output to the texture mapping unit.

A computer system aspect with an improved memory interface during texture mapping in image processing includes a central processing unit (CPU) for providing rendering commands and data, and core logic coupled to the CPU for transferring the rendering commands and data. Further included is a graphics processing mechanism coupled to the core logic. The graphics processing mechanism includes a texture mapping unit for receiving and processing texture elements, and a memory unit coupled to the texture mapping unit, the memory unit providing a plurality of texture elements to the texture mapping unit in a single cycle.

With the present invention, four channels of memory are interleaved spatially to ensure even data distribution, such that the memory space from which data is retrieved is broken up over multiple channels of memory so that access can occur in parallel. Thus, while one channel is busy retrieving data, a request can be sent to another channel, provided that the needed data is not in the busy channel. Further, the data is mapped so that the more frequently changing bits of the coordinate address addresses parts of memory that incur a lower latency penalty. In addition, the retrieved data is cached, which allows the data to be held until it can be processed, also syncs up the data, since the retrievals may occur at differing times due to differing latencies, and holds the data for the chance it will be used again to avoid having to reaccess memory. Thus, parallel access to multiple memory banks is achieved. Further, misaligned accesses are handled more efficiently to achieve same cycle data retrieval. In addition, a memory unit in accordance with the present invention provides improved functionality for faster operations to reduce problems associated with the random access nature of data retrieval during texel processing. These and other advantages of the aspects of the present invention will be more fully understood in conjunction with the following detailed description and accompanying drawings.

DETAILED DESCRIPTION

The present invention relates to improved rasterization of three-dimensional graphics in computer systems. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
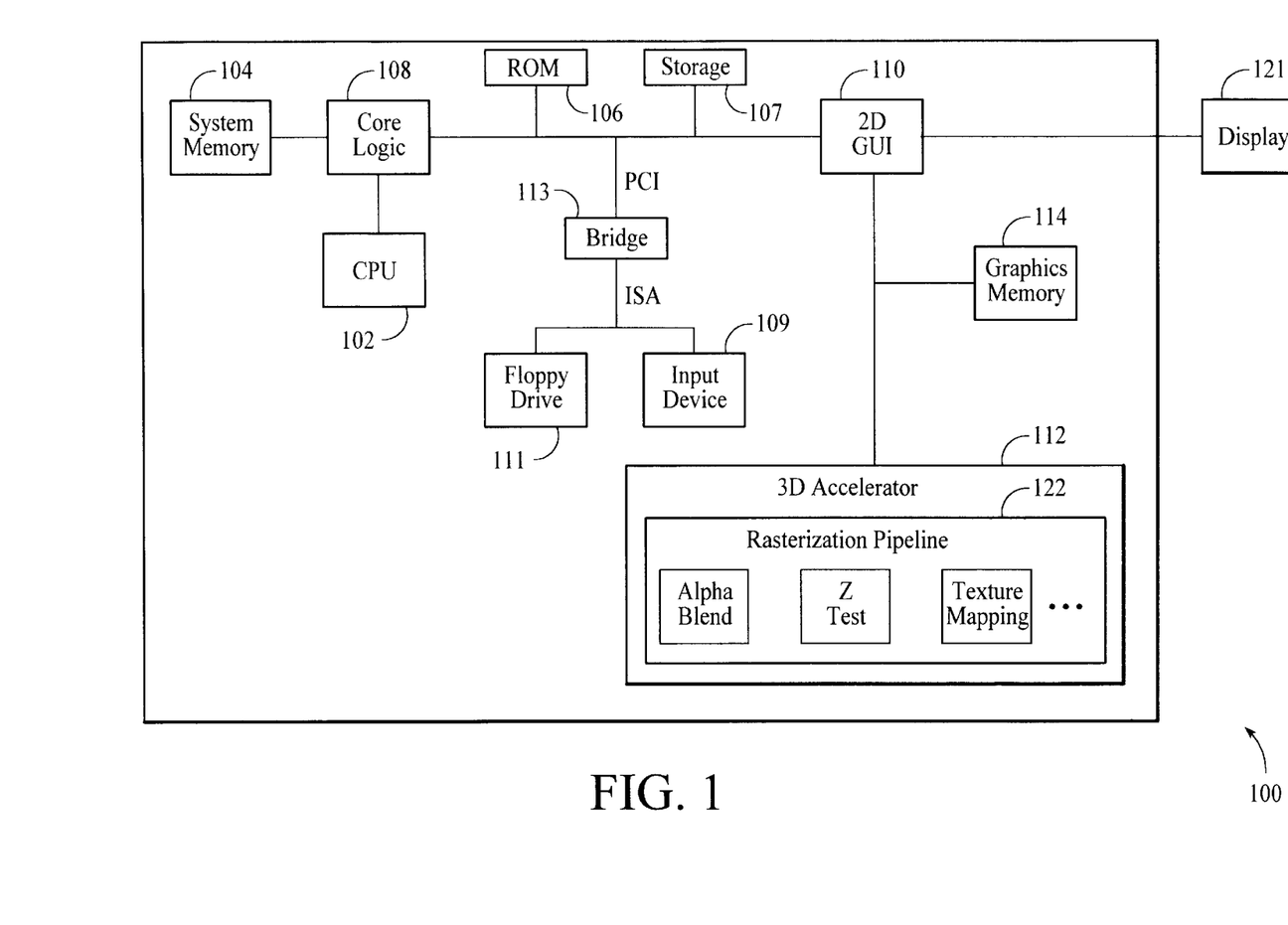
FIG. 1 illustrates a partial block diagram of a computer system including an image processing system in accordance with the present invention.

Referring to FIG. 1, a computer system 100 suitable for the present invention includes a central processing unit (CPU) 102 coupled to system memory 104, e.g. random access memory (RAM), and ROM 106, via core logic 108. System memory 104 suitably stores information and instructions executed by CPU 102. System memory 104 further stores temporary variables and other intermediate information during execution of instructions by CPU 102, as is well appreciated by those skilled in the art. Read only memory (ROM) or other form of static storage device 106 preferably stores static information and instructions for CPU 102. Other storage devices 107, such as a hard disk drive, are also suitably included for storing information and instructions.

As shown, core logic 108 suitably acts as a transfer agent between CPU 102 and graphics processing components, 2D GUI (two-dimensional graphical user interface) component 110 and 3D (three dimensional) accelerator component 112, which are shown as separate components, but which may combined in some system architectures. In addition, other system components, including storage device(s) 107, such as hard disk drives, are coupled to the CPU 102 via core logic 108, as well as input device(s) 109, such as a mouse, keyboard, or joystick, and floppy disk drive(s) 111, connected via bridge agent 113. A display device 121, such as a cathode ray tube (CRT) device or a liquid crystal display (LCD) device, suitably displays information to a computer user. In displaying three-dimensional graphics on the display device 121, computer system 100 performs numerous tasks utilizing the graphics processing components 110 and 112. Typically, pixel data that has undergone transform or geometry manipulations controlled by CPU 102, such as transversal modeling transform, primitive clipping, lighting, viewing transform, and more clipping, as is well appreciated by those skilled in the art, is transferred via core logic 108 to the 2D GUI component 110. 3D specific commands and data are then suitably transferred to the 3D accelerator component 112, which includes a rasterization pipeline 122. The 3D accelerator 112 suitably stores rendered frames in graphics memory component 114, e.g., a single unified memory component or a chosen number of separate memory components, with the rendered frames then processed by the 2D GUI component 110 and presented on the display device 121. The 3D accelerator 112 renders frames through the rasterization pipeline 122, which includes several pixel processing mechanisms, e.g., texture mapping, alpha blending, shading, etc.

Figure 2:
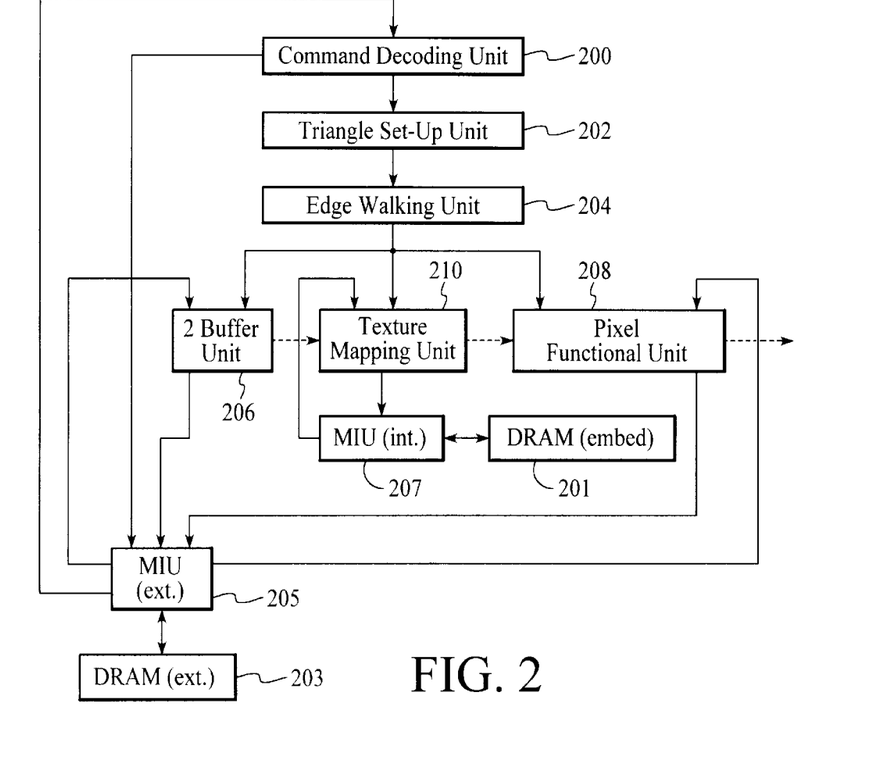
FIG. 2 illustrates a block diagram of typical stages for pixel processing.

Pixel data suitably is processed in stages via the rasterization pipeline 122. FIG. 2 illustrates a block diagram of typical stages for pixel processing. A command decoding unit 200 determines which pixels and texture elements, i.e., texels, need to be fetched out from memory. A triangle set-up unit 202 gets the commands from memory as determined by the command decoding unit 200 and performs preliminary operations, including calculating the delta values for the triangles forming the image, as is well understood by those skilled in the art. An edge walking unit 204 receives the data from the triangle set-up unit 202 and provides addresses for retrieving the data from memory to a Z buffer unit 206, a pixel functional unit 208 and a texture mapping unit, TMU, 210. In terms of the pipeline, generally the Z buffer unit 206 determines which of the pixels will actually be seen before the TMU 210 provides texture data and then the pixel functional unit 208 processes the data for output to the frame buffer or a data processing unit for subsequent display on a display device, e.g., a CRT. Suitably, the Z buffer unit 206 interacts with an external memory interface unit (MIU) 205, which retrieves data needed by the Z buffer unit 206 from external DRAM 203. The external MIU 205 and external DRAM 203 also interact similarly for processing by the command decoding unit 200 and pixel functional unit 208. The TMU 210 similarly interacts with an internal MIU 207 and embedded DRAM 201 during processing, as described hereinbelow.

Figure 3:
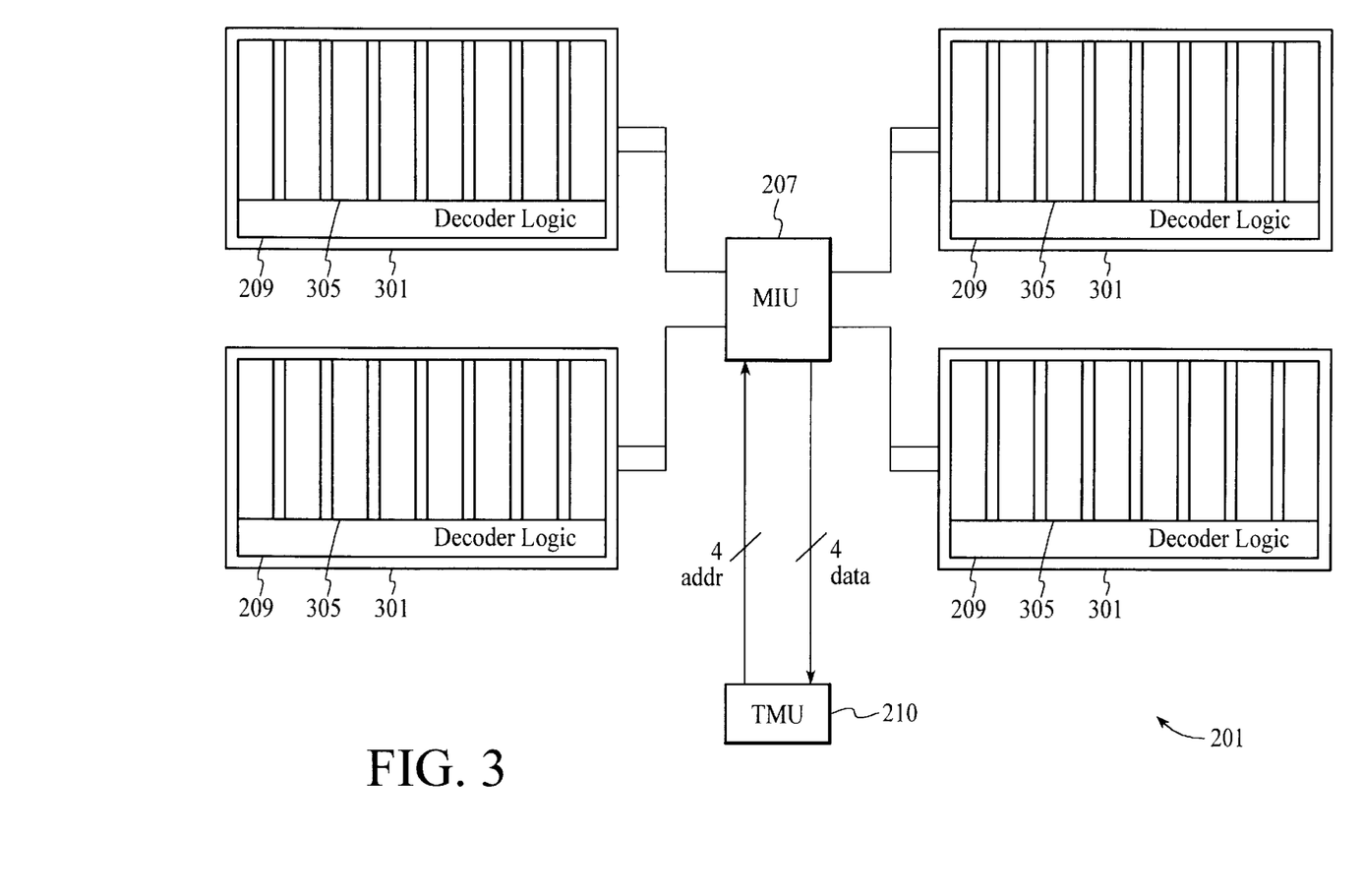
FIG. 3 illustrates a configuration for an embedded memory component in accordance with the present invention.

FIG. 3 illustrates a preferred embodiment of a layout of an embedded memory component 201, e.g., embedded dynamic RAM (DRAM), for use with a graphics processing mechanism, e.g., TMU 210. As shown, memory component 201 suitably is coupled to the MIU 207, and comprises four cache banks 301 of memory where each cache bank suitably comprises 32 bytes of SRAM. Each cache bank 301 caches data for a memory bank 305. The memory bank suitably is sub-divided into eight blocks. By way of example, memory bank 305 suitably comprises 256 kB (kilobytes) of DRAM, e.g., with 32 kB per block, so that with four memory banks 305, 1 MB (megabyte) of embedded DRAM 201 is provided. Of course, these sizes are meant as illustrative of a preferred embodiment, and may be adjusted as needed for particular design needs, as is well understood by those skilled in the art.

Preferably, each cache bank 301 is self-contained and able to be individually and independently addressed and accessed by the MIU 207. In accordance with the present invention, the MIU 207 takes requests from the TMU 210 that are typically correlated for sequential data retrieval. Rather than a row major approach, as would be typically used for the bit-mapped memory arrangement of texel data, preferably, the data is remapped so that there is locality to the addresses for improved efficiency of data retrieval. By way of example, in a row major approach, texel data is bit-mapped in accordance with an x-y coordinate system arrangement, such that texels are stored sequentially across rows of memory. With eights bits for the x and y coordinates, the address would normally be given as Y[7:0] X[7:0]. Normally, as data is retrieved from memory, the texels are correlated in that the first set of x-y coordinates will be close to the second set of x-y coordinates. Thus, the low order X and Y values tend to change more frequently than the higher order X and Y values between accesses. Unfortunately, with the row major approach, as the more significant bits of the address change, e.g., as the low order Y values change, page breaks often result, which incurs a greater latency penalty due to the inefficiency of opening and closing the required pages of memory.

In order to provide greater efficiency when accessing the texel data, the texel data is suitably remapped to allow sequential data retrieval with the more frequently changing bits of the X and Y coordinates at the low end of the address, i.e., . . . Y3 X3 Y2 X2 Y1 X1 Y0 X0. This provides more locality to the data and keeps the frequently changing, low order bits as the least significant bits of the address, and the less frequently changing, high order bits as the most significant bits of the address. Thus, a lower latency penalty results with page breaks occurring less frequently during data retrieval to improve the efficiency of memory accesses.

In a preferred embodiment, four separate sets of address lines are provided internally for each cache bank 301, as discussed hereinbelow with reference to FIG. 4, so that up to four addresses from a requestor agent, e.g., TMU 210, can be provided at the same time. Also included for each cache bank 301 is decoder/selection logic 209, e.g., multiplexing logic, that provides selection control of the memory banks 305 to achieve random access of data in parallel from the memory component 201 in accordance with the present invention, as described in more detail with reference to FIG. 4.

Figure 4A:
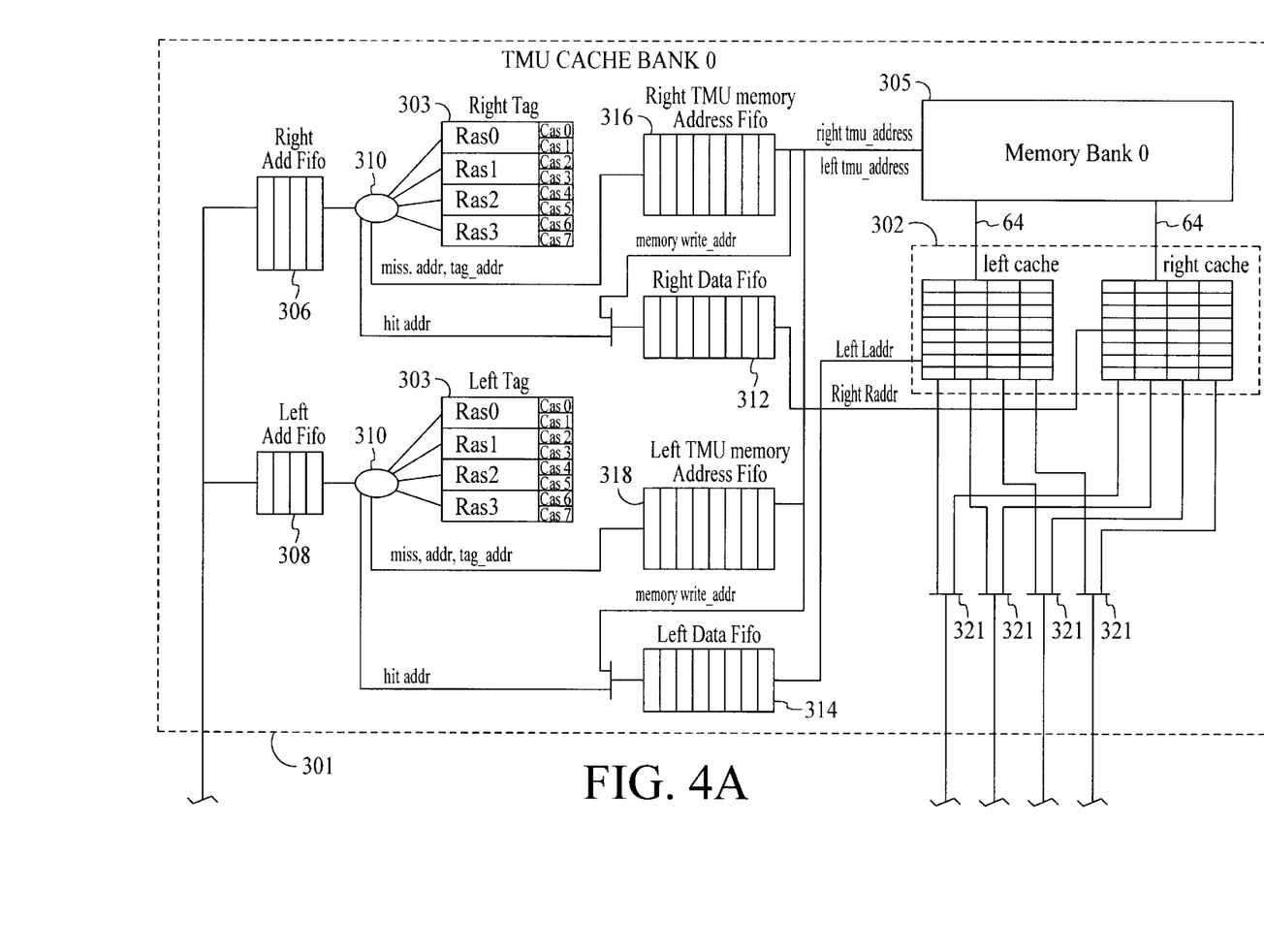
FIGS. 4 illustrates logical layouts of cache banks of FIG. 3 in accordance with the present invention.
Figure 4B:
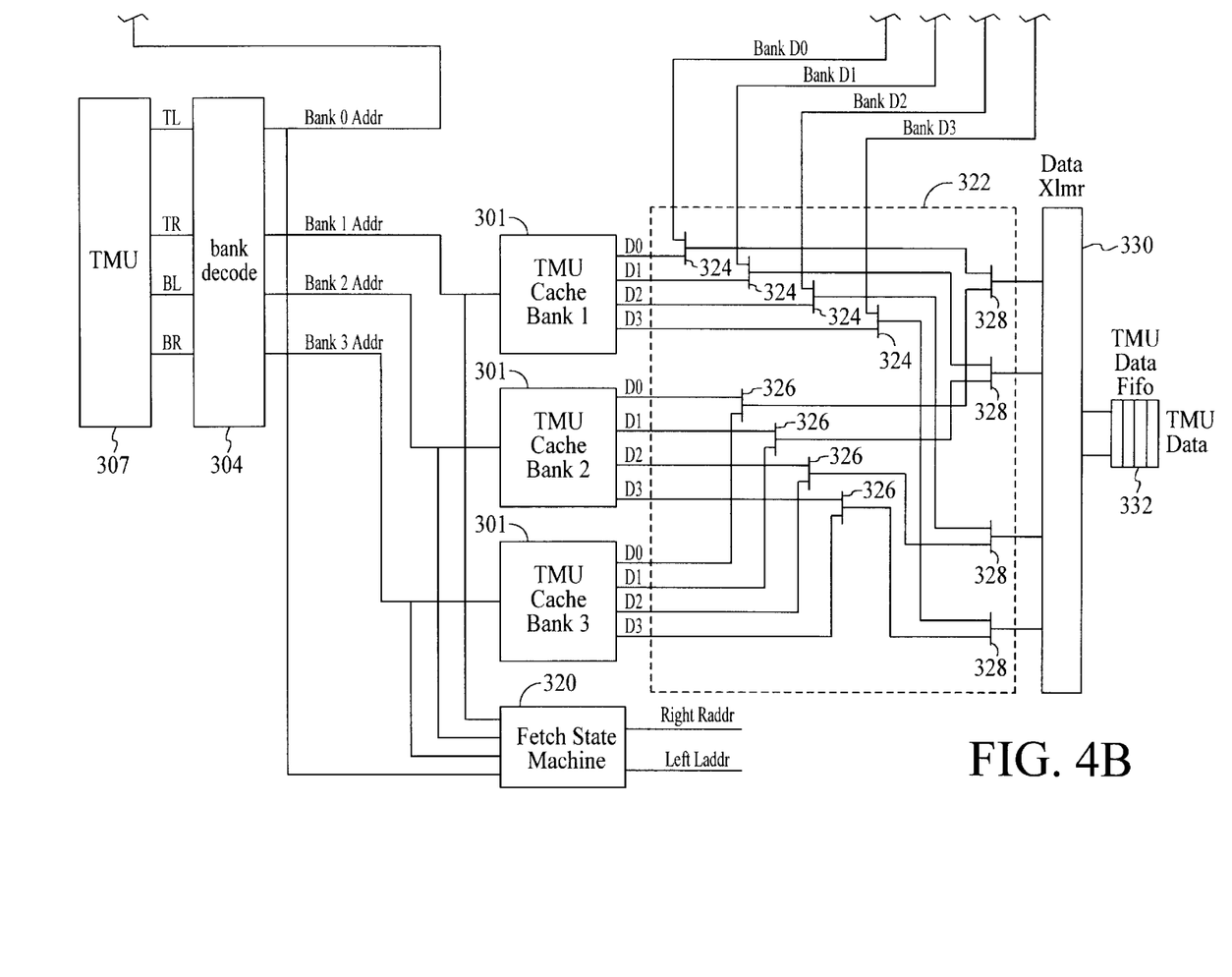

FIG. 4 illustrates a logical layout of the cache banks 301 and a preferred embodiment of the control mechanisms for data retrieval via the MIU 207 with the four independent cache banks 301, i.e., TMU cache bank 0, TMU cache bank 1, TMU cache bank 2, and TMU cache bank 3, of memory 201 (FIG. 3). The operations within each TMU cache bank are described with reference to TMU cache bank 0, but are applicable for each cache bank 301. In general, the texel data within the cache banks 301 is accessed in parallel to allow more than one texel to be accessed at the same time. To achieve parallel access of data, preferably the eight blocks of each memory bank 305 are arranged as four pairs. Associated pairs of blocks within the memory bank 305 preferably store upper and lower page halves, respectively. Although the pairs are associated, suitably the blocks are arranged logically in such a way that the upper and lower page halves are not adjacent and therefore can be activated at the same time. Preferably, image data is stored as quadwords, and each quadword of data is split up across the four channels, i.e., TMU cache bank 0, TMU cache bank 1, TMU cache bank 2, and TMU cache bank 3. For purposes of this discussion, a quadword of data suitably refers to four words, 16-bits per word, i.e., a 64-bit value. With the arrangement of memory banks 305 as four pairs of eight blocks and the provision of four sets of address lines to each cache bank 301, up to four separate addresses can be provided at the same time to allow up to four separate quadwords to be accessed in parallel. Thus, more selective access occurs to achieve retrieval of up to four random pairs of eight data bytes in parallel.

The MIU 207 includes separate memory controllers (not shown) for each cache bank 301 (with memory bandwidth shared between other resources as well as the TMU requests). In each cache bank 301, there lies a dedicated cache 302 for TMU read requests only. The cache 302 is suitably split across two arrays with a left half which handles memory data of bits [127:64] and a right half which handles memory data of bits [63:0]. Each half of the cache 302 is preferably organized as a 4 tag fully associative cache and is sectored with two entries. The cache 302 is preferably organized in a manner such that the memory RAS (row address strobe) address bits will fit in the tag field with the sector bits covering the memory CAS (column address strobe) address bits, as shown by tag look up block 303. The cache 302 suitably has eight entries with four texels per entry and 16 bits per texel. Thus, the cache 302 is suitably provided by two 32-byte SRAMs.

For texel data retrieval, the TMU 210 requests data by asserting a valid address request across either one or more control signals, top left (TL), top right (TR), bottom left (BL), and bottom right (BR) and providing a read address. The addresses are rerouted to the correct banks via a bank decode unit 304 which is suitably included in MIU 207. As shown, the bank decode unit 304 receives the control signals and determines from the control signals which of the cache banks 301 is the TL bank and if any of the other banks 301 are being accessed.

Figure 5:
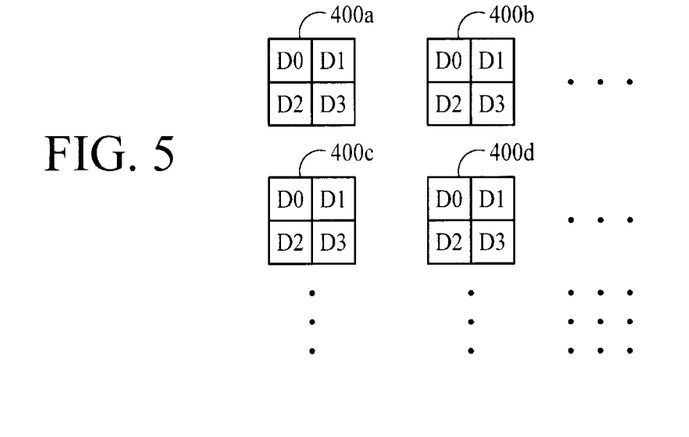
FIG. 5 illustrates organization of texel data as quadwords within the memory banks of FIG. 3.

Suitably, texel data is organized as quadwords 400a, 400b, 400c, and 400d, as shown in FIG. 5. Each quadword 400a–400d has first, second, third, and fourth texels indicated by the D0, D1, D2, and D3 designations, respectively. Suitably, quadword 400a represents a quadword from TMU cache bank 0, quadword 400b represents a quadword from TMU cache bank 1, quadword 400c represents a quadword from TMU cache bank 2, and quadword 400d represents a quadword from TMU cache bank 3. Of course, the series of four quadwords 400a–400d is continued for all of the texel data. Since four, eight, or sixteen texels are usually accessed at the same time to prevent aliasing, selection of texel data may cross cache bank boundaries. With the MIU 207 in accordance with the present invention, parallel access to texel data crossing cache bank boundaries is readily achieved and hides any of these misaligned accesses, providing multiple texels in a single cycle.

By way of example, assertion of the TL signal from TMU 210 would indicate selection of texels D0–D3 of the quadword 400a. Assertion of the TL signal and the TR signal would indicate selection of texels D1 and D3 of quadword 400a and texels D0 and D2 of quadword 400b. Suitably then, the texel data would be retrieved from TMU cache bank 0 and TMU cache bank 1. Assertion of the TL signal and the BL signal would indicate selection of texels D2 and D3 of quadword 400a and texels D0 and D1 of quadword 400c. Suitably, TMU cache banks 0 and 3 would be accessed for the texels. Assertion of the TL, TR, BL and BR signals would indicate selection of texel D3 of quadword 400a, texel D2 of quadword 400b, texel D1 of quadword 400c and texel D0 of quadword 400d. Selection of the texels would then occur from all four TMU cache banks. Of course, other designations than TMU cache bank 0 as the TL bank would result in other combinations of accesses to the TMU cache banks 301 based on the signals input from TMU 210 as TL, TR, BL, and BR.

Suitably, either one, two, or four cache banks are readily identified for access via the bank decode unit 304 of FIG. 4. Once the bank decode unit 304 decodes the address, each address is appropriately routed to the correct TMU cache bank 301 with right address FIFO 306 and left address FIFO 308 staging the address. From the left and right address FIFOs 306 and 308, tag controller units 310 compare the left and right addresses to the data from the tag lookup block 303 i.e., the 9 tag bits from the RAS and the 4 CAS address bits, as is well understood by those skilled in the art. If there is a match, e.g., as indicated by a hit addr signal, the address returned will be written to the right data FIFO 312 and left data FIFO 314, e.g., via a memory writeaddr signal, and then used to access the cache 302, e.g., via Right Raddr and Left Laddr signals. If there is a miss, e.g., as indicated by a miss_addr signal, the address is written to right and left memory address FIFOs 316 and 318 and to the memory controller (not shown), e.g., via a signal tag_addr. The data is then retrieved from memory bank 305 and the replacement address for writing the data into the cache 302 is determined, as is well understood by those skilled in the art. In addition, the replacement address is also sent to the right and left data address FIFOs 312 and 314.

For distinguishing data requests, a fetch state machine 320 of MIU 207 receives the decoded TL, TR, BL, and BR information from bank decode unit 304 to determine which cache banks 301 have the data. The fetch state machine 320 suitably waits until data is valid out of the cache 302 in the appropriate cache banks 301 and generates a read request to the data caches 302 when the addresses from the data FIFOs 312 and 314 are available in all the cache banks 301 being accessed. The appropriate data for texels D0-D3 is suitably selected via multiplexors 321 from the left and right halves of the cache 302. The texels from the appropriate cache banks 301 are then byte swapped, if required, via multiplexing selection logic 322 that includes multiplexors 324, 326, and 328.

The selection logic 322 suitably multiplexes corresponding first, second, third, and fourth texels from pairs of TMU cache banks 301. By way of example, as shown in FIG. 4, texels D0, D1, D2 and D3 from TMU cache banks 0 and 1 are multiplexed via multiplexors 324, while texels D0, D1, D2, and D3 of TMU cache banks 2 and 3 are multiplexed via multiplexors 326. The resulting selection of D0, D1, D2 and/or D3 from TMU cache banks 0 or 1 are multiplexed with the corresponding selection of D0, D1, D2 and/or D3 from TMU cache banks 2 or 3 via multiplexors 328 to form the selected quadword. A data transfer unit 330 swaps the texels in the right order to a TMU data FIFO 332 for processing by the TMU 210.

With the parallel access to multiple memory banks in the present invention, misaligned accesses are handled efficiently to achieve same cycle data retrieval. Further, the remapping of the texel data to a texel coordinate system aids in reducing the potential of page breaks when accessing data. Of course, although the remapping is described in terms of a two-dimensional arrangement, the principles are applicable to other multi-dimensional arrangements, e.g., x-y-z, x-y-z-a, as well. Also, the utilization of data caching in accordance with the present invention allows retrieved data to be held until it can be processed and further allows data to be synced up through the fetch state machine's control, since retrieval may occur at different times due to different latencies of retrieval.

Additionally, through the hierarchical arrangement of memory in accordance with the present invention, accesses to memory are split up across multiple memory banks within a single memory chip to effectively and efficiently retrieve desired image data. Thus, when four addresses are sent in parallel, four 64-bit values are returned in a single clock cycle. In contrast, typical data retrieval in a single bank memory would normally require four clock cycles to retrieve the same amount of desired data, plus any additional clocks needed during a page miss. Bandwidth is therefore effectively increased through the present invention with a corresponding effective increase in processing speed, as a result. Thus, the present invention provides improved functionality and operations at speeds that resemble that of SRAM (static RAM) but with much less expense.

Although the present invention has been described in accordance with the embodiments shown, one of ordinary skill in the art will recognize that there could be variations to the embodiment and those variations would be within the spirit and scope of the present invention. By way of example, although particular sizes are given with reference to texel data and memory components, other sizes may be used without departing from the spirit and scope of the present invention. Further, although the present invention focuses on a memory interface unit with texel data storage for use with a texture mapping unit, the principles of the invention may be applied to other configurations utilizing a memory interface unit and memory. Accordingly, many modifications may be made by one of ordinary skill without departing from the spirit and scope of the present invention, the scope of which is defined by the following claims.

What is claimed is:

1. A method for achieving independent access to memory that stores data in a graphics processing system, the method comprising:

providing a plurality of memory banks for data;

decoding signals that indicate accessing of at least one of the plurality of memory banks for a desired plurality of words of the data;

splitting data access across the plurality of memory banks to allow parallel selection of an output from at least one of the plurality of memory banks as the desired plurality of words of the data, wherein latency of data access is amortized, including multiplexing first, second, third and fourth words of data in pairs from the plurality of memory banks, multiplexing the resulting selected first, second, third and fourth words from each of the pairs to provide the desired plurality of words of the data, and byte-swapping the first, second, third and fourth words before transferring the desired plurality of words of the data to a texture mapping unit.

2. A method for achieving independent access to memory that stores data in a graphics processing system, the method comprising:

providing a plurality of memory banks for data, decoding signals that indicate accessing of at least one of the plurality of memory banks for a desired plurality of words of the data;

splitting data access across the plurality of memory banks to allow parallel selection of an output from at least one of the plurality of memory banks as the desired plurality of words of the data, wherein latency of data access is amortized; and remapping data in the plurality of memory banks by remapping most frequently changing bits to part of memory incurring a minimal penalty, wherein the remapping maintains locality of the data to provide efficient accessing of the plurality of memory banks.

3. The method of claim 1 wherein providing further comprises providing four memory banks.

4. The method of claim 3 wherein decoding input signals further comprises decoding a top left, top right, bottom left and bottom right signals.

5. The method of claim 2 further comprising transferring the desired plurality of words of the data to a texture mapping unit.

6. A system for improving data transfer from memory to a texture mapping unit in a graphics rendering system, the system comprising:

a plurality of cache banks for storing texel data;

a bank decode unit coupled to the plurality of cache banks for decoding a plurality of signals indicative of selection of the texel data from one or more of the plurality of banks; and selection control logic for receiving decoded address data from the bank decode unit and controlling selection of the plurality of cache banks to retrieve the texel data in parallel for output to the texture mapping unit, including a fetch state machine to receive decoded input signals from the bank decode unit and identify when one or more of the plurality of cache banks store the selected texel data.

7. The system of claim 6 wherein the plurality of cache banks comprise four cache banks.

8. The system of claim 6 wherein the fetch state machine further controls syncing up the selected texel data from the plurality of cache banks to account for varying retrieval times due to varying latencies among the plurality of cache banks.

9. The system of claim 6 wherein the selection control logic further comprises a plurality of multiplexor means for routing the selected texel data in a predetermined order to the texture mapping unit.

10. A computer system with an improved memory interface during texture mapping in image processing, the system comprising:
- a central processing unit (CPU) for providing rendering commands and data;
- core logic coupled to the CPU for transferring the rendering commands and data; and
- a graphics processing means coupled to the core logic, the graphics processing means comprising:
  - a texture mapping unit for receiving and processing texture elements; and
  - a memory unit coupled to the texture mapping unit, the memory unit providing a plurality of texture elements to the texture mapping unit in a single cycle, and including a plurality of cache banks for storing the texture elements with most frequently changing bits remapped to a part of memory incurring a minimal penalty, wherein locality of the data is maintained to provide efficient accessing of the plurality of memory banks.

11. The computer system of claim 10 wherein the graphics processing means further comprises a 2D GUI and a 3D accelerator.

12. The computer system of claim 11 wherein the 3D accelerator further comprises a rasterization pipeline, the rasterization pipeline including the texture mapping unit.

13. The computer system of claim 10 wherein the memory unit further comprises a bank decode unit coupled to the plurality of cache banks for decoding a plurality of input signals indicative of selection of texture elements from one or more of the plurality of cache banks.

14. The computer system of claim 13 wherein the memory unit further comprises selection control logic for receiving decoded address data from the bank decode unit and controlling selection of the plurality of cache banks to retrieve the texel data in parallel for output to the texture mapping unit.

15. The computer system of claim 13 wherein the bank decode unit decodes input signals comprising a top left, top right, bottom left and bottom right signals.

16. The computer system of claim 10 wherein each of the plurality of cache banks further comprises a memory bank.

17. A memory device capable of effectively increasing bandwidth for memory accesses during graphics rendering, the memory device comprising:
- a plurality of memory banks, each of the plurality of memory banks divided into a plurality of memory blocks; and
- decoding logic coupled to the plurality of memory banks, the decoding logic supporting parallel selection of data from at least one memory block of at least one memory bank in a single cycle, and including a fetch state machine to receive decoded input signals and identify when one or more of the plurality of memory banks store the selected texel data.

18. The memory device of claim 17 wherein the plurality of memory banks further comprises four memory banks.

19. The memory device of claim 18 wherein the plurality of blocks further comprises eight memory blocks for each memory bank.

* * * * *